(12) United States Patent
Haramein

(10) Patent No.: US 10,869,380 B2
(45) Date of Patent: Dec. 15, 2020

(54) PLASMA FLOW INTERACTION SIMULATOR

(71) Applicant: TORUS TECH, INC., San Clemente, CA (US)

(72) Inventor: Nassim Haramein, Carlsbad, CA (US)

( * ) Notice: Subject to any disclaimer, the term of this patent is extended or adjusted under 35 U.S.C. 154(b) by 0 days.

(21) Appl. No.: 15/953,176

(22) Filed: Apr. 13, 2018

(65) Prior Publication Data

US 2018/0235065 A1 Aug. 16, 2018

Related U.S. Application Data

(60) Continuation of application No. 15/343,024, filed on Nov. 3, 2016, now Pat. No. 9,949,355, which is a continuation of application No. 14/592,758, filed on Jan. 8, 2015, now Pat. No. 9,497,844, which is a division of application No. 13/412,333, filed on Mar. 5, 2012, now Pat. No. 8,933,595, which is a continuation-in-part of application No. 12/837,295,
(Continued)

(51) Int. Cl.
| | |
|---|---|
| H05H 1/12 | (2006.01) |
| G09B 23/06 | (2006.01) |
| H02K 44/06 | (2006.01) |
| H02K 44/08 | (2006.01) |
| H05H 1/03 | (2006.01) |
| G09B 23/12 | (2006.01) |
| G06F 30/20 | (2020.01) |
| H05H 1/04 | (2006.01) |
| H05H 1/00 | (2006.01) |
| G06F 111/10 | (2020.01) |

(52) U.S. Cl.
CPC .............. *H05H 1/12* (2013.01); *G06F 30/20* (2020.01); *G09B 23/06* (2013.01); *G09B 23/12* (2013.01); *H02K 44/06* (2013.01); *H02K 44/085* (2013.01); *H05H 1/0006* (2013.01); *H05H 1/03* (2013.01); *H05H 1/04* (2013.01); *G06F 2111/10* (2020.01)

(58) Field of Classification Search
CPC .......... H05H 1/12; H05H 1/04; H02K 44/085; G06F 17/5009; G09B 23/12
USPC ....................................... 156/345
See application file for complete search history.

(56) References Cited

U.S. PATENT DOCUMENTS

| | | | |
|---|---|---|---|
| 554 | A | 1/1838 | Dawson |
| 3,278,384 | A | 10/1966 | Lenard et al. |
(Continued)

FOREIGN PATENT DOCUMENTS

| | | |
|---|---|---|
| EP | 0248382 A2 | 1/1987 |
| EP | 0563899 A | 10/1993 |
| JP | 63178432 A | 7/1988 |

OTHER PUBLICATIONS

Allen, S. W., et al., The Relation Between Accretion Rate and Jet Power in X-Ray Luminous Elliptical Galaxies, Mon. Not. R. Astron. Soc. vol. 372 (1) pp. 21-30, 2006.
(Continued)

*Primary Examiner* — Terrance L Kenerly

(57) ABSTRACT

A plasma interaction simulator is presented. The simulator magnetically induces multiple distinct flows of plasma within a physical plasma vessel. The plasma flows collide with each other at flow interaction boundaries where discontinuities arising due to differences between the flows give rise to interactions. Sensors can be incorporated into the plasma simulator to observe and collect data about the plasma flow interactions.

20 Claims, 7 Drawing Sheets

Related U.S. Application Data filed on Jul. 15, 2010, now Pat. No. 8,130,893, which is a division of application No. 11/976,364, filed on Oct. 24, 2007, now Pat. No. 8,073,094.

(56) References Cited

U.S. PATENT DOCUMENTS

| | | | |
|---|---|---|---|
| 3,417,273 A * | 12/1968 | Gates | H05H 1/54 313/153 |
| 3,574,485 A | 4/1971 | Herman, Jr. | |
| 3,692,626 A | 9/1972 | Ohkawa | |
| 4,011,478 A | 3/1977 | Reenstra | |
| 4,068,174 A | 1/1978 | Svelund | |
| 4,236,964 A | 12/1980 | Bass et al. | |
| 4,267,488 A | 5/1981 | Wells | |
| 4,274,919 A | 6/1981 | Jensen et al. | |
| 4,330,864 A | 5/1982 | Ohyabu | |
| 4,543,231 A * | 9/1985 | Ohkawa | H05H 1/12 376/121 |
| 4,560,528 A | 12/1985 | Ohkawa | |
| 4,615,861 A | 10/1986 | Fisch | |
| 4,654,561 A | 3/1987 | Shelton | |
| 4,663,567 A | 5/1987 | Wong | |
| 4,734,247 A | 3/1988 | Schaffer | |
| 5,198,181 A | 3/1993 | Jacobson | |
| 5,818,891 A * | 10/1998 | Rayburn | G21B 1/05 376/107 |
| 6,027,603 A | 2/2000 | Holland et al. | |
| 6,237,526 B1 | 5/2001 | Brcka | |
| 6,313,555 B1 | 11/2001 | Blumenstock et al. | |
| 6,484,492 B2 | 11/2002 | Meholic et al. | |
| 6,575,889 B1 | 6/2003 | Reiffel | |
| 6,815,899 B2 | 11/2004 | Choi | |
| 6,888,434 B2 * | 5/2005 | Nordberg | G21B 1/05 335/296 |
| 6,855,906 B2 | 10/2005 | Brailove | |
| 7,079,001 B2 | 7/2006 | Nordberg | |
| 7,079,085 B2 | 7/2006 | Lee et al. | |
| 7,139,349 B2 | 11/2006 | Leung | |
| 8,073,094 B2 | 12/2011 | Haramein | |
| 8,130,838 B2 | 3/2012 | Haramein | |
| 8,933,595 B2 | 1/2015 | Haramein | |
| 2001/0022158 A1 | 9/2001 | Brcka | |
| 2002/0080904 A1 | 6/2002 | Rostoker et al. | |
| 2003/0007587 A1 | 1/2003 | Monkhorst et al. | |
| 2003/0057845 A1 | 3/2003 | Edamura et al. | |
| 2003/0062840 A1 | 4/2003 | Moroz | |
| 2003/0192644 A1 | 10/2003 | Pu et al. | |
| 2004/0164682 A1 | 8/2004 | Hopwood et al. | |
| 2005/0157832 A1 | 7/2005 | Nordberg | |
| 2006/0060464 A1 | 3/2006 | Chang | |
| 2006/0082238 A1 | 4/2006 | Kusase et al. | |
| 2006/0108931 A1 | 5/2006 | Park et al. | |
| 2006/0198483 A1 | 9/2006 | Laberge | |
| 2008/0289650 A1 * | 11/2008 | Arena | B08B 7/0057 134/1.2 |
| 2009/0108682 A1 | 4/2009 | Haramein | |
| 2012/0223643 A1 | 3/2012 | Haramein | |
| 2015/0163891 A1 | 7/2015 | Haramein | |

OTHER PUBLICATIONS

Amatucci, W. E., et al., Dusty Plasma Dynamics in the NRL Space Physics Simulation Chamber Laboratory, Plasma Physics Division, Naval Research Laboratories, 2003.

Berhanu, M., et al., Magnetic field reversals in an experimental turbulent dynamo, EPL, vol. 77, 59001, 2007.

Casse, F., MHD Accretion-Ejection Flows Astrophysics and Space Science vol. 293, No. 1-2, Aug. 2004.

Casse, F., et al., Radiatively Inefficient MHD Accretion Ejection Structures, The Astrophysical Journal vol. 601, Part 1, pp. 90-103, 2004.

Combi, M. R., Studies of Tenuous Planetary Atmospheres, Technical Report, NASA/CR-1997-208226; NAS 1.26:208226 Space Physics Research Lab. Jan. 1997.

Coppi, B., Angular Momentum Transport at All Scales in the Universe, 44th Annual Meeting of the Division of Plasma Physics, APS Session QPI—Poster Session VII., Rosen Centre Hotel Orlando, Florida, Nov. 2002.

Coppi, B. et al., Angular Momentum Transport in Thin Accretion Disks and Intermittent Accretion, Phys. Rev. Lett. vol. 87, 051101, 2001.

De Kool, M., et al., Magnetic Fields in Accretion Discs, Pub. of the Astronomical Society of Australia, vol. 16, p. 225, 1999.

Ekenback, A., et al., MHD modeling of the interaction between the solar wind and solar system objects, in Proceedings of PARA'04 State-of-the-Art, Lecture Notes in Computer Science, Springer-Verlag, Berlin, 2004.

Gailitis, A., et al., Magnetic Field Saturation in the Riga Dynamo Experiment, Phys. Rev. Lett. vol. 86 pp. 3024-3027, 2001.

Garofalo, D. & Reynolds, C. S., Sporadically Torqued Accretion Disks Around Black Holes, The Astrophysical Journal, vol. 624 ( 1 ), pp. 94-102, May 2005.

Haramein, N. et al., The Origin of Spin: A Consideration of Torque and Coriolis Forces in Einstein's Field Equations and Grand Unification Theory, In: The Search for Unity in Physics: Extending the Standard Model, R. L. Amoroso, B. Lehnert & J-P Vigier (Eds.) Special Issue of the Noetic Journal vol. 6 No. 1-4, 2005a.

Haramein, N. et al., Collective Coherent Oscillation Plasma Modes in the Surrounding Media of Black Holes and the Vacuum Structure—Quantum Processes with Considerations of Spacetime Torque and Coreolis Forces, In: The Search for Unity in Physics: Extending the Standard Model, R. L. Amoroso, B. Lehnert & J-PVigier (Eds.) Special Issue of the Noetic Journal vol. 6 No. 1-4, 2005b.

Haramein, N., A Scaling Law for Organized Matter in the Universe, [AB.006], Session AB-Astronomy and Space Physics, Joint Fall Meeting of the Texas Sections of the APS and AAPT, and Zone 13 of the SPS, Texas Christian University; Fort Worth, Texas, Oct. 4-6, 2001.

Hawley, J. F., Global Magnetohydrodynamical Simulations of Accretion Tori, The Astrophysical Journal, vol. 528, 462, 2000.

Hawley, J. F., et al., A Magnetohydrodynamic Nonradiative Accretion Flow in Three Dimensions Astrophysical Journal Letters vol. 554, Part 2, pp. L49-L52(2001).

Hawley, J. F., et al., The Dynamical Structure of Nonradiative Black Hole Accretion Flows, The Astrophysical Journal, vol. 573, pp. 738-748, 2002.

Hawley, J.F. et al., Global MHD Simulation of the Inner Accretion Disk in a Pseudo-Newtonian Potential, The Astrophysical Journal, vol. 548, p. 348, 2001.

Hawley, J.F. et al., High Resolution Simulations of the Plunging Region in a Pseudo-Newtonian Potential: Dependence on Numerical Resolution and Field Topology, The Astrophysical Journal, vol. 566, p. 164, 2002.

Ji, H. S., et al., Hydrodynamic Turbulence Cannot Transport Angular Momentum Effectively in Astrophysical Disks, Nature vol. 444, pp. 343-346, Nov. 16, 2006.

Kuncic, Z. et al., Dynamics and Energetics of Turbulent, Magnetized Disk Accretion around Black Holes: A First-Principles Approach to Disk-Corona-Outflow Coupling, The Astrophysical Journal, vol. 616(1) pp. 669-687, 2004.

Lechte, C., et al., Microscopic Structure of Turbulence in the Torsatron TJ-K, American Physical Society, 45th Annual Meeting of the Division of Plasma Physics, Albuquerque, New Mexico, Meeting ID: DPP03, abstract #UPI.044, Oct. 27-31, 2003.

Ledvina, S. A., et al., A Three-Dimensional MHD Model of Plasma Flow Around Titan: A Tool for Cassini Mission Planning, Planetary and Space Science, vol. 46(9) pp. 1175-1191, 1998.

Marsch, E., Acceleration potential and angular momentum of undamped MHD-waves in stellar winds, Astronomy and Astrophysics, vol. 164(1), pp. 77-85, 1986.

Mitra, D. et al., Dynamics of Passive-Scalar Turbulence, Phys. Rev. Lett. vol. 95, 144501, 2005.

(56) References Cited

OTHER PUBLICATIONS

Monchaux, R. et al., Generation of Magnetic Field by Dynamo Action in a Turbulent Flow of Liquid Sodium, Phys. Rev. Lett. vol. 98, 044502, 2007.

Papaloizou et al., The Interaction of a Giant Planet With a Disc with MHD Turbulence 1: The Initial Turbulent Disc Models, MNRAS vol. 339, p. 923, 2003a.

Pishkalo, M. I., Reconstruction of the Heliospheric Current Sheet Tilts Using Sunspot Numbers, Solar Physics, vol. 233 (2), 2006.

Reynolds, C. S., et al., Trapping of Magnetic Flux by the Plunge Region of a Black Hole Accretion Disk, The Astrophysical Journal, vol. 651 (1), pp. 1023-1030, 2006.

Rieger, F. M. et al., Particle Acceleration Timescales in Relativistic Shear Flows, 22nd Texas Symposium on Relativistic Astrophysics at Stanford University, Dec. 13-17, 2004.

Sanderson, T. R., Observations of the Sun's magnetic field during the recent solar maximum, Journal of Geophysical Research, vol. 108, No. AI, p. 1035, 2003.

Spence, E. J. et al., Observation of a Turbulence-Induced Large Scale Magnetic Field, Phys. Rev. Lett. vol. 96, 055002, 35.

Stefani, F., et al. Experimental Evidence for Magnetorotational Instability in a Taylor-Couette Flow Under the Influence of a Helical Magnetic Field, Phys. Rev. Lett. vol. 97, 184502, 2006.

Volk, R., et al. Transport of Magnetic Field by a Turbulent Flow of Liquid Sodium, Phys. Rev. Lett. vol. 97, 074501, 2006.

Alboussiere, T., et al., MHD Turbulence in a Rotating Spherical Couette Flow of Sodium with an Imposed Dipolar Magnetic Field, GTP Workshop on Modeling MHD Turbulence; Applications to Planetary and Stellar dynamos, At: NCAR, Boulder, CO, USA, Jun. 27-30, 2006.

Cravens, T.E., et al., A two-dimensional multifluid MHD model of Titan's plasma environment, Planetary and Space Science vol. 46, Issues 9-10, pp. 1193-1205, 1998.

Daglis, I.A., et al., Key features of intense geospace storms—A comparative study of a solar maximum and a solar minimum storm, Planetary and Space Science, vol. 55, pp. 32-52, 2007.

Hawley, J. F., Global MHD Simulations of Cylindrical Keplerian Disks, The Astrophysical Journal, vol. 554, p. 534, 2001.

Ji, H.S. et al., Current-Sheet Buildup and Magnetic Reconnection in Weakly Ionized Solar Lower Atmosphere, Solar Physics, vol. 198( 1 ), pp. 133-148, Jan. 2001.

Schulz, M., Fourier Parameters of Heliospheric Current Sheet and Their Significance, Space Science Reviews, vol. 72, No. 1-2, pp. 149-152, 1995.

University of New Mexico, Design of the New Mexico Liquid Sodium ct-eo Dynamo Experiment, Dec. 24, 2001.

\* cited by examiner

PLASMA FLOW INTERACTION SIMULATOR

This application is a continuation of U.S. patent application Ser. No. 15/343,024, filed Nov. 3, 2016, which is a continuation of U.S. patent application Ser. No. 14/592,758, filed Jan. 8, 2015, which now issued U.S. Pat. No. 9,497,844, which is a divisional of U.S. patent application Ser. No. 13/412,333, filed Mar. 5, 2012, now issued as U.S. Pat. No. 8,933,595, which is continuation-in-part of U.S. patent application Ser. No. 12/837,295, filed Jul. 15, 2010, now issued U.S. Pat. No. 8,130,893, which is a divisional of U.S. patent application Ser. No. 11/976,364, filed on Oct. 24, 2007, now issued U.S. Pat. No. 8,073,094. This and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

FIELD OF THE INVENTION

The field of the invention is plasma control technologies.

BACKGROUND

Flow dynamics of plasmas and gases continues to be a topic of much interest as scientists study plasma flows relating astronomical phenomenon. For example, much effort has been directed to studying plasma flows in the sun, around black holds, within planetary atmospheres (e.g., Jupiter, Saturn, etc.), or other under other circumstances. In addition, work in fusion requires manipulating, controlling, or confining plasmas in fusion reactors via magnetic fields. Unfortunately, technologies directed toward controlling fusion plasmas for containment are not necessarily practical when studying plasma flow interactions. Example technologies employing magnetic fields to control fusion plasmas, ionized gases, or charged particle beams include the techniques described in the following references.

U.S. Pat. No. 4,236,964 to Bass et al. titled "Confinement of High Temperature Plasmas", filed Oct. 18, 1974, describes confining a plasma in a smooth toroidal configuration by constructing a toroidal magnetic bottle.

U.S. Pat. No. 4,267,488 to Wells, titled "Containment of Plasmas at Thermonuclear Temperatures", filed Jan. 5, 1979, discloses using multiple magnetic fields to generate a ring-like toroidal plasma vortex structure.

U.S. Pat. No. 4,330,864 to Ohyabu titled "Double Layer Field Shaping Systems for Toroidal Plasmas", filed Jun. 28, 1978, describes using multiple conducting coils to generate magnetic fields to control plasma generation, confinement, and control.

U.S. Pat. No. 4,654,561 to Shelton titled "Plasma Containment Device", filed Oct. 7, 1985, discusses using electromagnets to sustain a ball of plasma rather than a toroidal configuration as some of the previous references.

U.S. Pat. No. 5,198,181 to Jacobson titled "Stabilizing Plasma in Thermonuclear Fusion Reactions Using Resonant Low Level Electromagnetic Fields", filed Apr. 27, 1992, discusses using strong magnetic fields for confinement and weaker magnetic fields to cause a plasma to resonant.

U.S. Pat. No. 6,027,603 to Holland et al. titled "Inductively Coupled Planar Source for Substantially Uniform Plasma Flux", filed Nov. 28, 1997, describes using planar coils to generate magnetic fields that control generation of a plasma flux on a workpiece surface.

U.S. Pat. No. 6,484,492 to Meholic et al. titled "Magnetohydrodyanmic Flow Control for Pulse Detonation Engines", filed Jan. 9, 2001, discloses using magnetic and electric fields to control a traveling detonation flame front within a pulse detonation engine.

U.S. Pat. No. 6,575,889 to Reiffel titled "Scanning and Flexing Charged Particle Beam Guide", filed Nov. 24, 1999, discusses varying magnetic fields to guide particle beams useful in radiation oncology.

U.S. Pat. No. 7,079,001 to Nordberg titled "Nuclear Fusion Reactor Incorporating Spherical Electromagnetic fields to Contain and Extract Energy", filed Mar. 16, 2005, describes using a spherical magnetic confinement field to contain plasma. Electrical power is obtained inductively from a reactor core.

U.S. patent application publication 2002/0080904 to Rostoker et al. titled "Magnetic and Electrostatic Confinement of Plasma in a Field Reversed Configuration", filed Jul. 25, 2001, and U.S. patent application publication 2003/0007587 to Monkhorst et al. titled "Controlled Fusion in a Field Reversed Configuration and Direct Energy Conversion", filed Feb. 14, 2002, both describe using magnetic fields to confine a plasma during fusion.

These and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

Although the above references provide a great deal of insight into using magnetic fields to contain, confine, or control plasmas, the techniques they suggest would not be practical in a small laboratory setting. Nor would the techniques be useful in generating interactions between two or more plasma flows because the interactions between flows would, by their nature, cause instabilities within the plasma flows. Interestingly, known efforts to date have focused on achieving some form of controlled stability of plasma flows. What has yet to be appreciated is that a plasma interaction simulator can be designed and built where magnetic fields can induce multiple plasma flows in a plasma vessel where the flows interact due to discontinuities between the flows. One can then observe how the plasma flows interact at their interaction boundaries. Contemplated simulators can be used to model atmospheric banding on gas giants, plasma flows of the Sun, or other interesting plasma interaction phenomenon.

Thus, there is still a need for plasma interaction simulators.

SUMMARY OF THE INVENTION

The inventive subject matter provides apparatus, systems and methods in which one can simulate plasma flows within a laboratory environment. One aspect of the inventive subject matter is considered to include a plasma interaction simulator where plasma contained within a vessel can be induced to flow in response to magnetic fields. Loops of conducting material can be disposed about the plasma vessel and can generate various configurations of magnetic fields when current flows through the conducting loops. The magnetic fields can be controlled to induce two or more distinct plasma flows where the flows interact at an interaction boundary between the flows. Interactions occur at the boundaries due to gradients or discontinuities arising from differences between the flows.

Interaction boundaries between plasma flows can be generated by inducing multiple plasma flows via controlling the currents in conducting loop via one or more loop control circuits. Interaction boundaries can include counter-flow interactions, opposed-flow interactions, aligned-flow interactions, or other types of interactions. In some embodiments, the flows include two counter rotating toroidal flows that interact at an equatorial plane of the plasma vessel.

Various objects, features, aspects and advantages of the inventive subject matter will become more apparent from the following detailed description of preferred embodiments, along with the accompanying drawing figures in which like numerals represent like components.

DETAILED DESCRIPTION

It should be noted that while the following description comprises disclosure directed to control circuits, various alternative configurations of control circuits are also deemed suitable and may employ various computing devices including servers, interfaces, systems, databases, engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclose apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

One should appreciate that the disclosed techniques provide many advantageous technical effects including producing observable plasma flow interactions.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Figure 7:
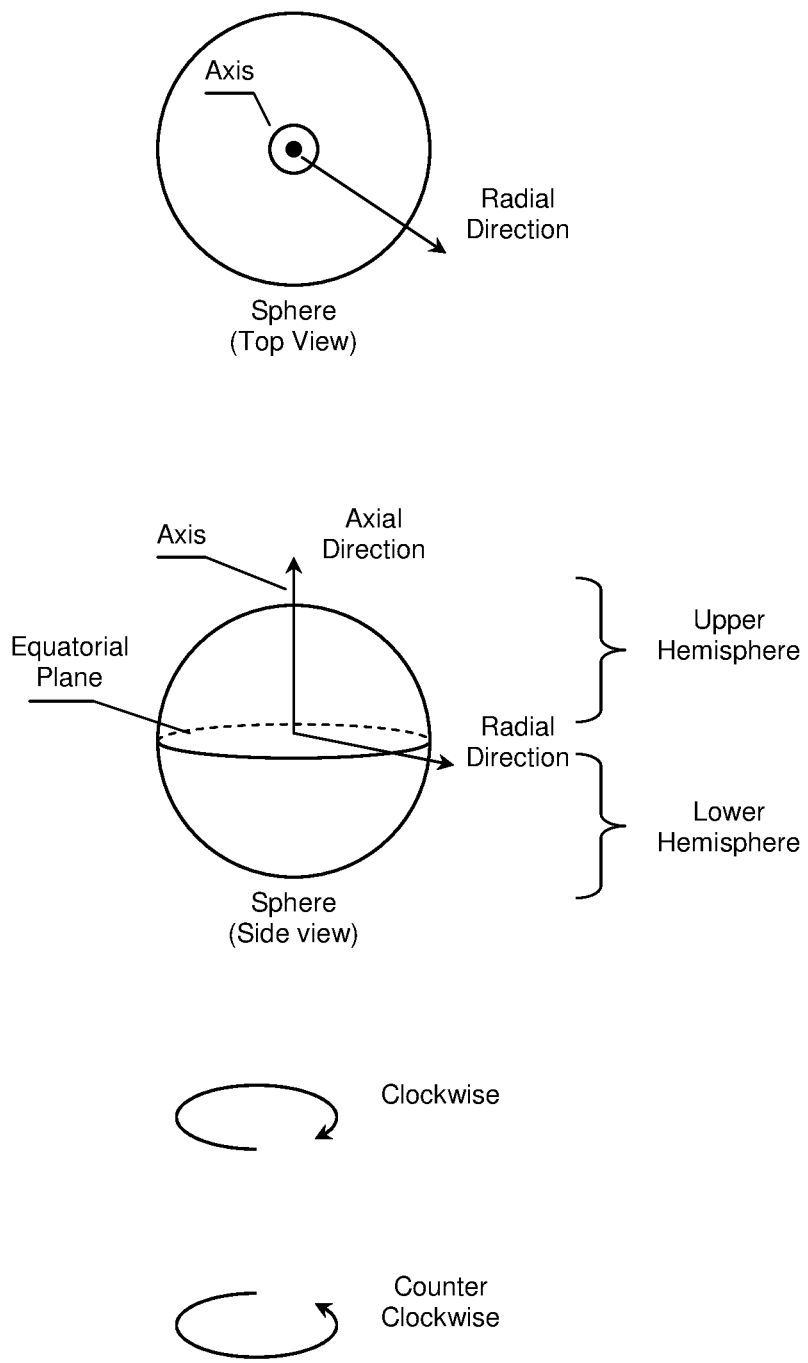
FIG. 7 illustrates orientations associated with descriptive terms used with respect to the figures presented.

The reader's attention is directed to FIG. 7 which graphically illustrates how terms reflecting orientations or directions (e.g., radial, axial, clockwise, etc.) are use in reference to the figures.

Figure 1:
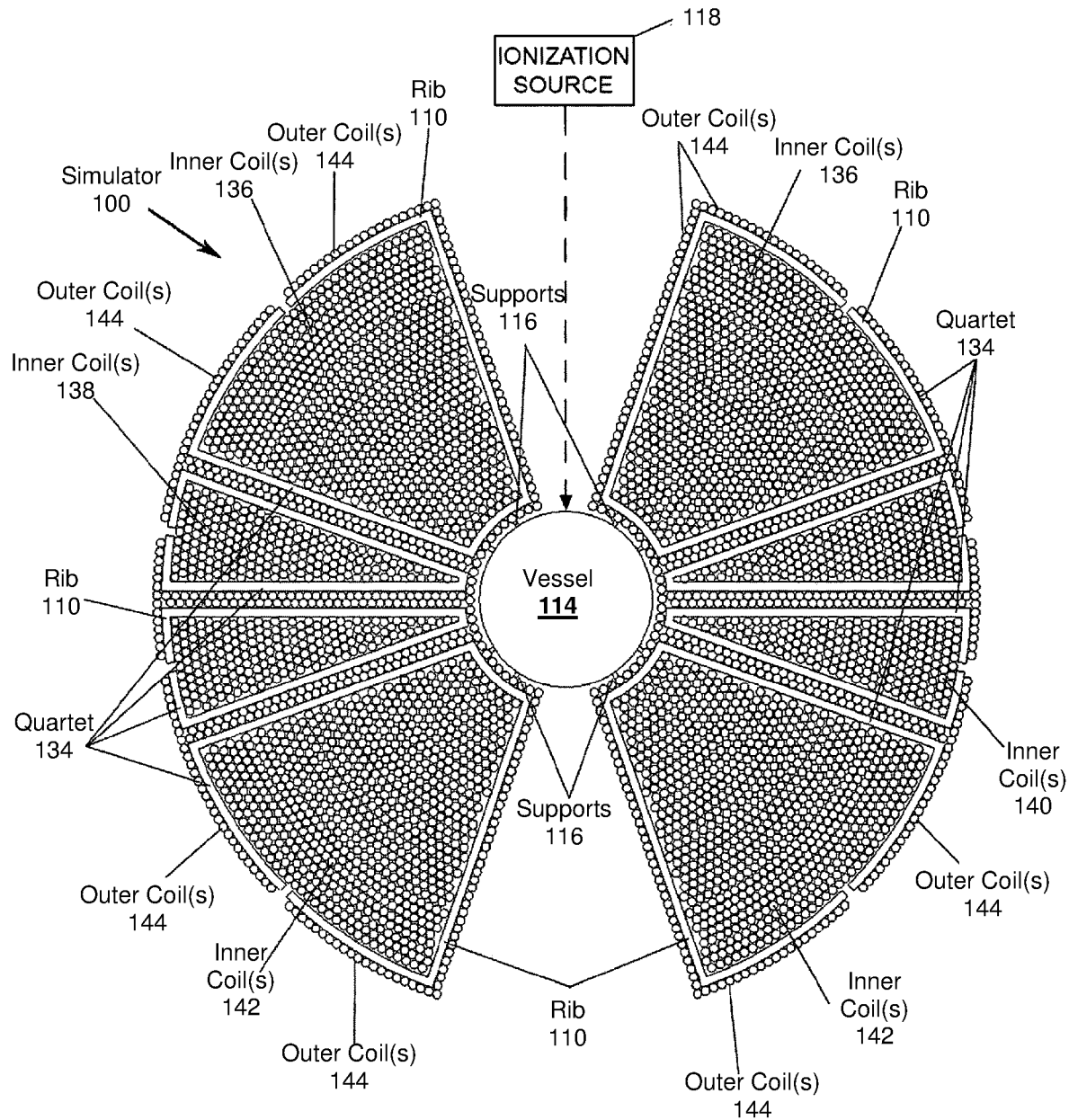
FIG. 1 is a schematic overview of a possible plasma interaction simulator.

In FIG. 1 simulator 100 represents a cross sectional view of one possible embodiment of a plasma interaction simulator. Simulator 100 is described more fully in co-pending parent U.S. patent application having Ser. No. 11/976,364 to Haramein titled "Device and Method for Simulation of Magnetohydrodynamics" filed Oct. 24, 2007.

Simulator 100 broadly comprises plasma vessel 114 containing an ionizable gas and surrounded by a plurality of individually controlled conducting loops. The conducting loops comprise conducting coils as represented by inner coils 136, 138, 140, and 142, and by outer coils 144. The conducting loops can also include one or more ribs 110 through which inner coils 136, 138, 140, or 142 thread. Each of the conducting coils is configured to generate electromagnetic fields within plasma vessel 114 when a current pass through the coils. The interplay of the fields induces multiple plasma flows within plasma vessel 114 where the plasma flows interact at flow interaction boundaries.

One should appreciate that disclosed techniques are directed to causing plasma flow interactions at an interaction boundary between the flows rather than merely confining or containing plasma. The inventive subject matter is considered to include creation of the plasma flows and allowing the plasma flows to interaction as desired. Plasma flow interactions can arise due to substantial gradients or discontinuities between the flows.

Ribs 110 are disposed in radial directions about plasma vessel 114. Ribs 110 have a portion closest to vessel 114 where the portion can conform to the shape of plasma vessel 114. In the example shown, vessel 114 is a sphere and the portions closest to vessel 114 are curved according to the spherical shape of vessel 114. Ribs 110 can be spaced away from vessel 114 by one or more of support 116. As current flows through ribs 110, magnetic fields are generated that penetrate within vessel 114.

In the example shown ribs 110 are arranged in rib groups extending radially from an axis of simulator 100, the groups as represented by quartets 134. The cross sectional view of simulator 100 presents two of quartets 134 while a full version would have more groups. The number ribs 110 in a group vary and depends on many factors including size of vessel 114, required field strength, material used, desired simulation, or other factors. The number of rib groups can also vary. For example, in a more preferred embodiments having a spherical vessel 114, twelve of quartets 134 can be around vessel 114 at equally spaced angles (i.e., about every 30 degrees). Other embodiments could have a different number of groups. A cylindrical vessel 114 might only utilize four groups where each group has only one or two ribs 110.

Ribs 110 preferably comprise a conducting material possibly including aluminum, copper, or other conductors. Typically, ribs 110 can be constructed with struts having a cross sectional area of about 0.25 inches on a side for a small desktop apparatus. Naturally, the size can be scaled as desired. More preferred conductors include those capable of conducting heat so that heat can be dissipated via an outer surface of simulator 100.

As mentioned briefly above, inner coils 136, 138, 140, and 142 thread through ribs 110. One should appreciate that each of the inner coils can pass through multiple ribs 110. For example, inner coil 136 winds around an axis of simulator 100 and winds through all of the upper hemisphere's top-most ribs 110. In some embodiments, each of the inner coils represents a single winding of a conductor (e.g., aluminum, copper, etc) having multiple turns so the interior regions of ribs 110 are filled. However, in other embodiments, multiple individually controlled inner coils can also be disposed within the interior regions of each rib 110.

Outer coil 144 represents a single coil winding around the exterior of ribs 110. Although represented as a single coil 144 having multiple turns around simulator 100, one could construct multiple, individually controlled outer coils 144. One should note, as illustrated, outer coil 144 can thread through the space between vessel 114 and the closest portion of ribs 110 near vessel 114.

Plasma simulator 100 can also include ionization source 118. Ionization source 118 can be used to ionize gases contained within vessel 114 and can be arranged so that ionizing energy can be directed axially toward vessel 114. For example, two ultraviolet lasers can be positioned above each pole of simulator 100 and their beams can be directed along the axis of simulator 100. Suitable ionization sources include lasers, gamma ray sources, or other ionizing energy sources.

Although plasma vessel 114 is illustrated as a sphere, other shapes are also contemplated. For example, plasma vessel 114 can be constructed as a cylinder where the contained plasma can be induced to flow about the axis of the cylinder. Ribs 110 and conduction coils can be configured appropriate to fit the size, shape, or dimensions of vessel 114. Other shapes can be constructed as well beyond a sphere or cylinder. However, shapes having rounded surfaces interior surfaces (e.g., sphere, cylinders, round disks, etc.) are more preferred as such shapes typically offer better models for physical phenomenon. For example, a sphere can provide for multiple flow interaction boundaries that model atmospheric phenomenon at different latitudes due to the flows following the interior contours of plasma vessel 114. A cylinder can be used to model flows at different depths in a column of plasma. A disk might be used to model accretion disk interactions.

One should appreciate that the plasma can be considered "cold" and does not necessarily require confinement as plasmas in fusion reactions require. Rather, the interior contours of vessel 114 can be used to confine the plasma. Still, one should further appreciate that the plasma within plasma vessel 114 can achieve high temperatures as the plasma flows circulate at high speeds within vessel 114. In some embodiments, flows can circulate around vessel 114 at high frequencies greater than $10^6$ cycles per second (i.e., 1 MHz), even as high as 20 MHz. At such frequencies, the temperature of the plasma flows, even at low pressure, can become quite high.

Plasma vessel 114 can be prepared according to a desired simulation. In some embodiments, plasma vessel 114 is prepared by forming two halves of the vessel 114, two hemispheres for example in the case of a sphere. The two halves can be placed in a gas chamber filled with a desired gas mixture at a desired pressure. The two halves can then be joined and sealed thus enclosing a desired volume of the gas mixture. Drawn crystal has shown to be a useful material for constructing vessel 114 to withstand operational limits of simulator 100. The gas mixture can be configured to match a desired simulation (e.g., helium, hydrogen, nitrogen, argon, etc.) and have a desired pressure. Pressures of $10^{-3}$ to $10^{-4}$ torr are considered adequate for most modeling purposes. Still, all pressures sustainable by plasma vessel 114 are contemplated.

Once plasma vessel 114 has been prepared, it can be placed within simulator 100 and subjected to magnetic fields resulting from currents flowing through the various conducting loops (e.g., ribs 110, outer coils 144, inner coils 136, 138, 140, or 142). To further understand the operation of simulator 100, one should understand how the magnetic fields are generated by the various conducting loops.

Figure 2:
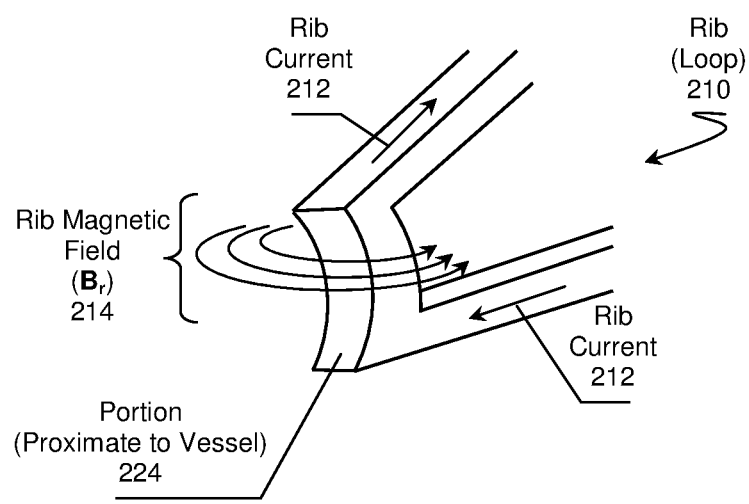
FIG. 2 illustrates a magnetic field generated by a rib conducting loop of a plasma interaction simulator.

FIG. 2 illustrates a possible rib magnetic field ($B_r$) 214 generated by rib 210. As rib current 212 flows around rib 210, a magnetic field is generated. Rib portion 224 represents the portion of rib 210 proximate or closest to the plasma vessel. Rib portion 224 generates magnetic field 214, which penetrates into the vessel. The magnitude and direction of rib current 212 can be adjusted to achieve the desired magnetic field 214. In more preferred embodiments, rib current 212 is pulsed in a manner where the current direction remains constant, while the magnitude of the current cycles from a minimum to a maximum. The initial pulses might cycle from a magnitude of zero up to maximum amount, while during an operational phase of a simulation might pulse the current magnitude from a minimum non-zero value to a maximum value. Thus, the magnitude of the current remains within a time-dependent envelope.

As the flux of rib magnetic field 214 changes within the plasma of the plasma vessel, the flux induces a flow of plasma according to the well known Maxwell's equations. Each rib 210 can be cycled according to its own sequence alone or in conjunction with other ribs to generate simple or highly complex flow patterns. Thus, the operation of the plasma simulator can be controlled with a high level of precision by an operator.

Figure 3:
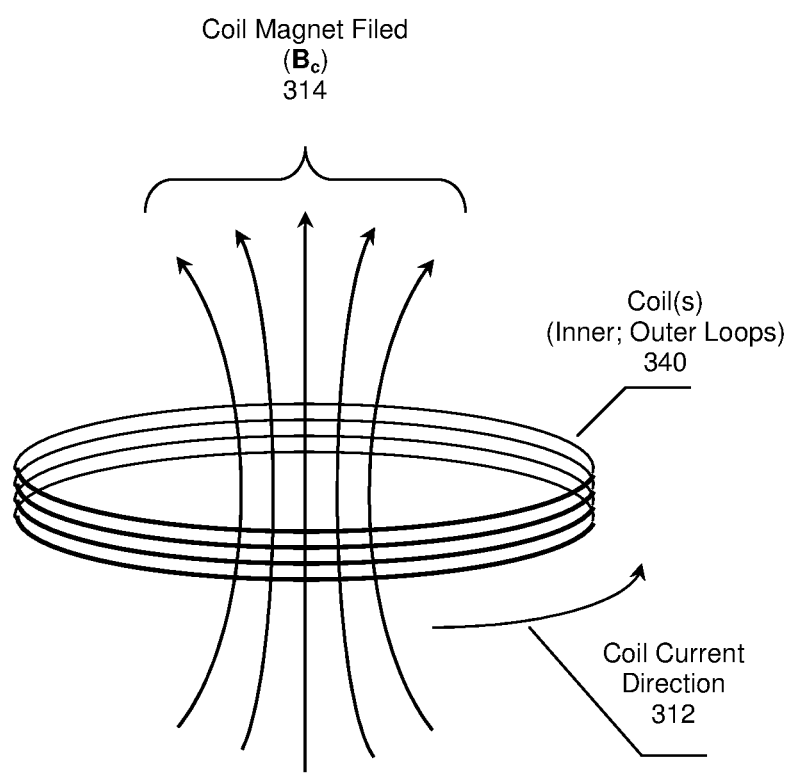
FIG. 3 illustrates a magnetic field generated by a coil conducting loop of a plasma interaction simulator.

FIG. 3 illustrates a coil magnetic field ($B_c$) 314 generated by one or more coils 340 in response to a coil current 312 in coil 340. Coils 340 as discussed above are circumferentially disposed about an axis of the plasma simulator so that coil magnetic field 314 runs generally in an axial direction through the plasma vessel based on current 312. As with the rib conducting loops, each of coils 340 can be individually controlled so that current 312 can be adjusted as desired. By constructing a plasma simulator having multiple coils 340 an operator can create a highly complex set of axial magnetic fields 314 that interact within the contained plasma. Coil magnetic fields 314 originating from different coil conduction loops can be aligned with each other or can be counter to each. From the configuration of conducting loops in FIGS. 1, 2, and 3 one can see that rib conducting loops are substantially orthogonal to the coil conduction loops, which in turn yields orthogonal magnetic fields.

In some modeling environment, coil magnetic field 314 can be static or dynamic depending on the desired simulation. An astute reader will appreciate that coil magnetic field 314 can be used to model planetary magnetic fields. Thus, one can construct a model of aurora as the plasma flows travel along polar or axial magnetic field lines.

Figure 4:
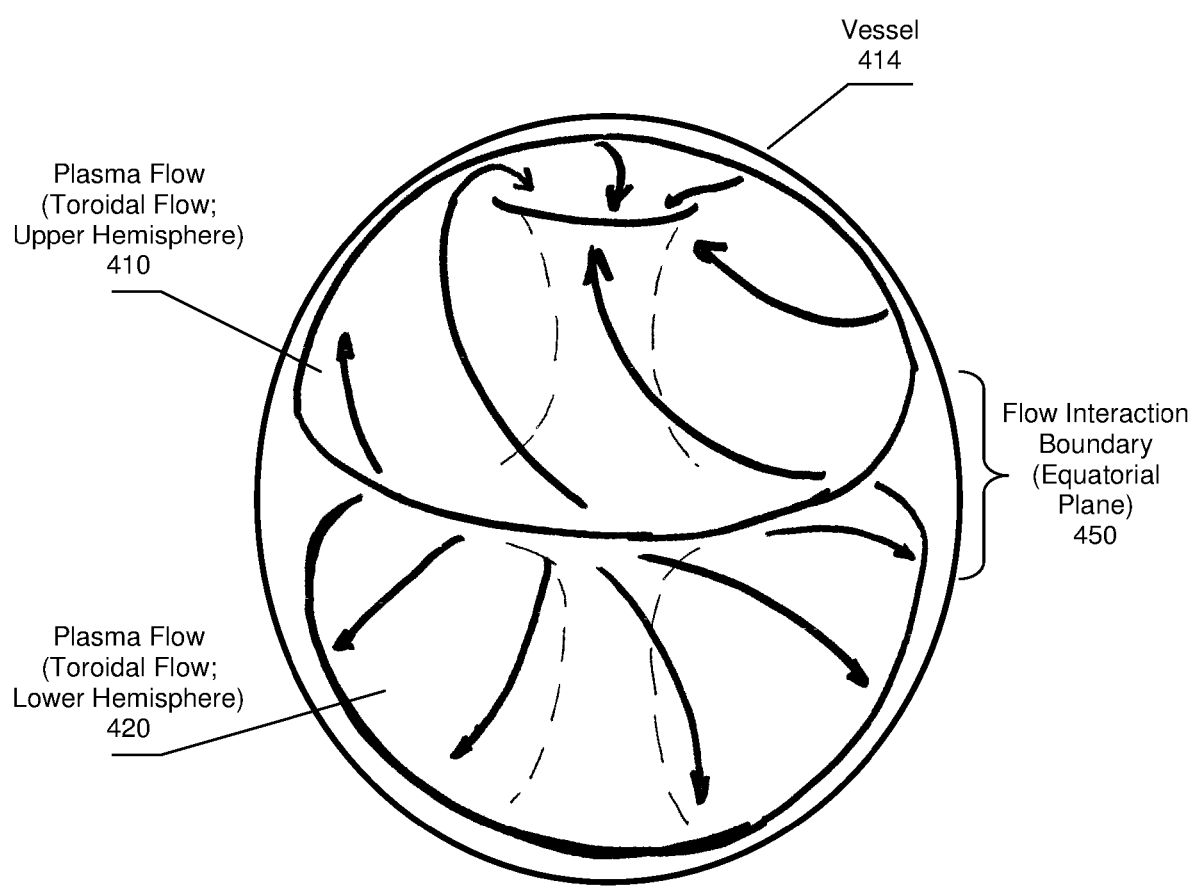
FIG. 4 is a schematic of two interacting plasma flows having an equatorial interaction boundary.

In an especially preferred embodiment, the rib magnetic fields and coil magnetic fields interact with each other to form one or more toroidal plasma flows as illustrated by FIG. 4. In view that an operator (e.g., human, computer, etc.) can control each conducting loop individually, which also controls each loop's magnetic field, the operator can create highly complex stable plasma flows. In the example shown, an operator has created toroidal flow 410 in an upper hemisphere of plasma vessel 414 and a separate distinct toroidal flow 420 in a lower hemisphere of plasma vessel 414.

Toroidal flows 410 and 420 represent plasmas flows were the plasma circulates out from the flows at the equatorial plane of plasma vessel 414, up following the interior surface walls of plasma vessel 414, then in toward the poles or along the axis of the toroidal flows. Each flow comprises plasma that flows in a helical manner about the tori. Pulsing rib conducting loop currents causes the plasma to flow while the coil loop currents provide axial field lines that guide plasma down through the axis of the torus.

One should note that each of toroidal flows 410 and 420 can be created by controlling the magnetic fields of conducting loops in the upper hemisphere of the plasma simulator separately from the conducting lops in the lower hemisphere of the plasma simulator. Thus the coil magnetic fields in the upper hemisphere can be in an opposite direction from the coil magnetic fields in the lower hemisphere as desired.

By construction two or more distinct flows, for example toroidal flows 410 and 420, flow interaction boundary 450 is formed. In the example shown, flow interaction boundary 450 is located in an equatorial plane of plasma vessel 414. One can then observe interactions between flows 410 and 420 via one or more sensors disposed about plasma vessel 414 or around the plasma simulator. Although FIG. 4 illustrates that interaction boundary 450 is located an equatorial plane, one should keep in mind that through suitable configurations of magnetic fields arising from the conducting loops the interaction boundary 450 can be generated at any latitude, or other locations. For example, one could cause interaction boundary 450 to occur at 22 degrees away from equatorial plane (i.e., latitude of Jupiter's Great Red Spot), or even have multiple interaction boundaries at various latitudes. Especially preferred latitudes include 19.5 degrees, 54.7 degrees, or 70.5 degrees as suggested by key angles derived from a $U_4$ metric contemplated by Haramein and Rauscher (see paper titled "The Origin of Spin: Consideration of Torque and Coriolis Forces in Einstein's Field Equations and Grand Unification Theory" by Haramein et al., Beyond the Standard Model: Searching for Unity in Physics, pages 153-168, The Noetic Press © 2005).

One should appreciate that plasma flows can be created and controlled via the pixilated nature of the rib and coil conducting loops. Thus, one can create many different essentially smooth plasma flows that can interact at one or more interaction boundaries 450. Interaction boundary 450 represents areas of instability caused by interactions of the plasma flows. The instabilities, or gradients, arising from competing flows provide insight into the physics of interaction plasmas.

Figure 5:
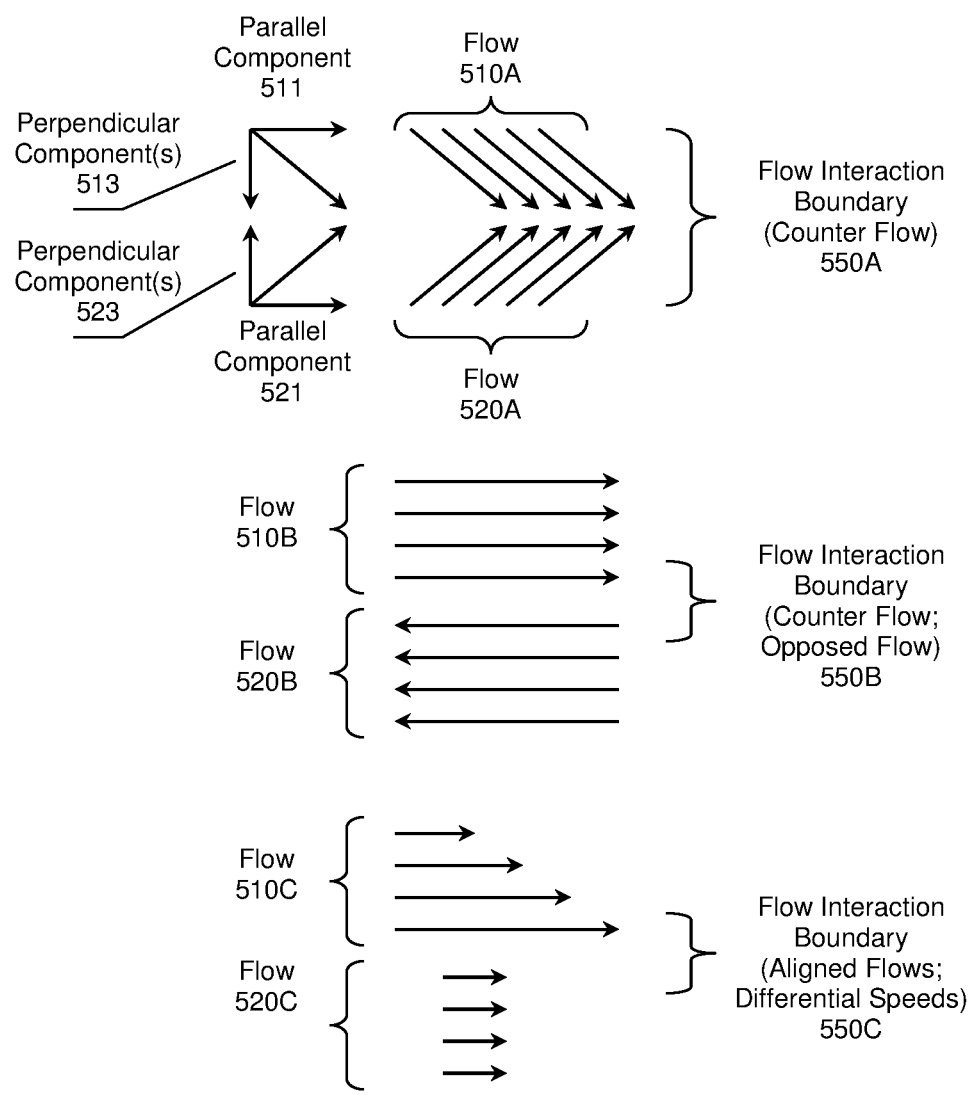
FIG. 5 illustrates various types of plasma flow interaction boundaries that can be achieved with the contemplated plasma interaction simulator.

FIG. 5 presents various classes of interaction boundaries 550A, 550B, or 550C collectively referred to as boundaries 550, that could arise from interactions of plasma flows. Keeping in mind that a plasma flow can be represented by a vector field, interaction boundaries 550 are considered to be areas of instability between flows that arise due to discontinuities from one plasma flow's vector field to another. Discontinuities can occur due to differences in directions of the plasma flows at their boundaries, differences in magnitude of their vectors, or both. Interaction boundaries 550 present different types of discontinuities. The examples are presented in two dimensions for clarity. However, one skilled in the art will now appreciate that discontinuities or gradients in a flow's vector field can occur in more than two dimensions.

Flow interaction 550A comprises a counter-flow interaction where flow 510A can be represented as a vector field having at least one vector component counter to the vector field of flow 520A at their interaction point. In the example shown, flow 510A has parallel component 511 which is parallel to parallel component 521 of flow 520A, thus these components are aligned, but are not counter to each other. However, perpendicular component 513 of flow 510A is opposite to, or counters perpendicular component 523 of flow 520A. In such an arrangement, flow 510A and 520A are considered to have a counter flow interaction.

Flow interaction 550B presents a more severe type of counter-flow. Flow interaction 550B illustrates an opposed flow where flow 510A is of an opposite direction (i.e., an opposed direction) to that of flow 520A even though the flows have similar magnitude. Interaction boundary 550B would likely be unstable due to the counter, opposed flows.

Flow interaction 550C illustrates yet another example where flows are in the same direction, but have different magnitudes. Flow 510C has a vector field that is aligned with the vector field of flow 520C where aligned is considered parallel. However, flow 510C has a vector field of greater magnitude (e.g., rate, speed, etc.) than that of flow 520C.

Flow interaction boundaries 550 can be constructed to have discontinuities within the contemplated plasma simulator, which also allows for generating gradients between flows. For example, referring back to FIG. 4, toroidal flow 410 could have a substantially different rate of flow than flow 420 and could also be a counter toroidal flow to flow 420. When modeling such a system, interesting dynamics can be observed at interaction boundary 450. The inventive subject matter is considered to include generating substantial gradients, discontinuities, or discontinuities in gradients between plasma flows resulting from differences in direction, speed, angular momentum, or other plasma flow parameter.

Figure 6:
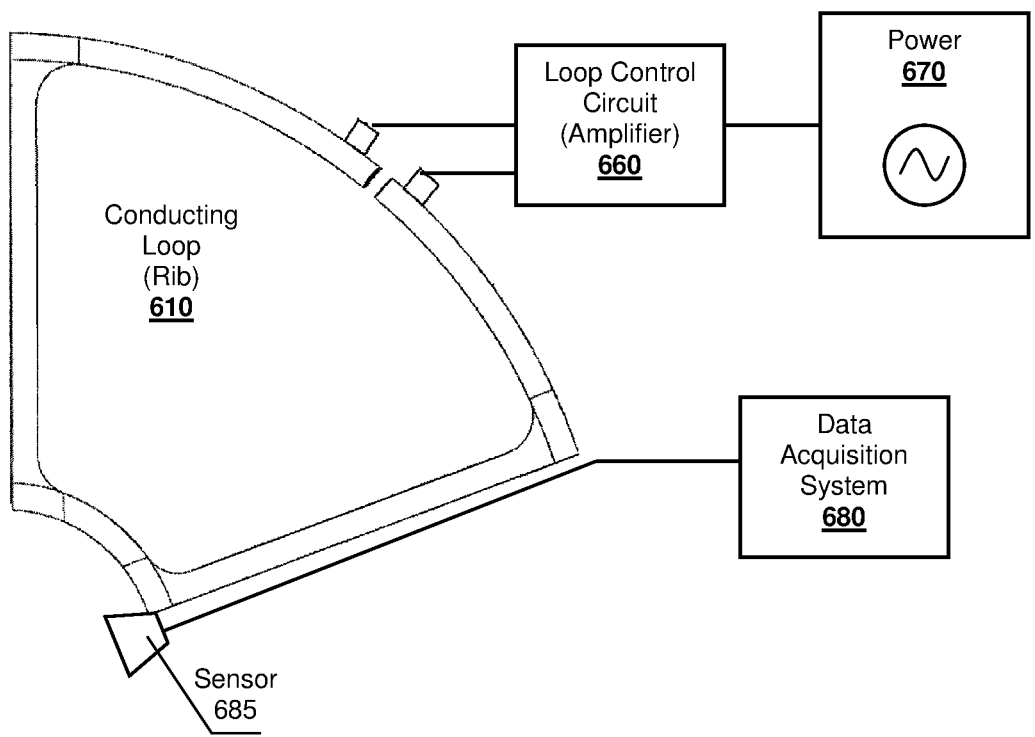
FIG. 6 is a schematic of a rib conducting loop under control of a loop control circuit.

To generate desired plasma flows, an operator of the plasma simulator can control each conducting loop independently according to a desired sequence. FIG. 6 provides an illustration of loop control circuit 660 providing current to rib 610. The operator can programmatically instruct loop control circuit 660 to direct power from power source 670 to rib conducting loop 610 to generate a desired magnetic field. In some embodiments, loop control circuit 660 comprises a computer controlled amplifier capable of directing current from power source 670, under controlled conditions, to rib conducting loop 610. For example, when first initiating flows, small magnitude pulses would likely be required, then as the flows ramp up to speed, stronger pulses would be required. Once a desired flow has been established, maintenance pulses can be used to maintain a substantially stable flow. Thus, a regimen or a program of pulses can change with time. Furthermore, each conducting loop can have its own loop control circuit and power supply so each conducting loop can properly cooperate with other conducting loops.

To achieve high flow rates, power supply 670 and control circuit 660 can be configured to support a substantially smooth ramp up from zero to high rates (e.g., 1 MHz or greater) at nominal operating parameters. In more preferred embodiments a single control circuited 660 can support the ramp up without requiring multiple control circuits that switch at over to another at each operational stage.

For laboratory desktop environments, a power supply 670 capable of supplying up to 4000 W of power would be sufficient, where greater power would be more preferable. Naturally, the materials used in construction of the conducting coils must be able to withstand nominal operating conditions. For example, rib or coil conducting loops should be able to support currents necessary to generate desired magnetic fields while also dissipating heat.

Contemplated plasma interaction simulators can also include one or more of sensor 685 positioned proximate to the plasma vessel. In the example shown in FIG. 6, sensor 685 is positioned near rib conducting loop 610 in a manner where sensor 685 will be adjacent to the plasma vessel when rib 610 is placed into position. Although sensor 685 is shown in a position to be near the plasma vessel, sensor 685 can also be positioned further away depending on the sensor or desired data to be collected. One or more of sensor 685 can send collected raw data to data acquisition system 680 for storage or analyses. Data acquisition system 680 can include one or more computers or databases.

Sensor 685 is presented to euphemistically represent various types of sensors that can be used in conjunction with modeling plasma flow interactions. Example sensors include optical sensors configure to capture light emanating from plasma flow interactions, particle detectors for charged particles or neutral particles (e.g., photo tubes, CR-39 film, CCDs, etc.), Langmuir probes to measure electron density properties, magnetometers to measure magnetic fields, Hall effect sensors, pressure or temperature gauges to measure state of plasma, mass spectrometers, scintillation counters, calorimeters, or other sensors that would be appropriate for a given experiment. In some embodiments, sensors can be position along the axis of the simulator to gain access to the plasma vessel.

Although the disclosed techniques are directed toward gas-based plasma, it is contemplated that one could apply similar techniques to ferromagnetic fluids or fluids that could be ionized.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

The invention claimed is:

1. A method of spinning plasma, comprising:
within a sphere vessel, spinning a first portion of a plasma in a first direction, and spinning a second portion of the plasma in a second direction opposite to the first direction; and
independently controlling the spinning of the first and second portions of the plasma using magnetic fields generated via conducting loops.

2. The method of claim 1, wherein the conducting loops are disposed outside the sphere vessel.

3. The method of claim 1, wherein spinning the first portion of the plasma in the first direction further comprises using a first rib loop and a first coil positioned about the sphere vessel.

4. The method of claim 3, wherein the first coil traverses through the first rib loop.

5. The method of claim 1, wherein spinning the first portion of the plasma generates a first toroidal plasma flow.

6. The method of claim 5, wherein spinning the second portion of the plasma generates a second toroidal plasma flow.

7. A method of simulating a plasma flow interaction, comprising:
enclosing a gas mixture in a plasma vessel sphere;
placing, after enclosing the gas mixture, the plasma vessel sphere within a simulator having conducting loops and an ionization source;
ionizing the gas mixture in the plasma vessel sphere using the ionization source to produce an ionized gas mixture; and
generating magnetic fields via the conducting loops to create first and second flows of the ionized gas mixture that interact at an interaction boundary.

8. The method of claim 7, wherein the plasma vessel sphere is made from crystal.

9. The method of claim 7, wherein the first and second flows are counter rotating.

10. The method of claim 7, wherein the conducting loops comprises a plurality of ribs and a plurality of coils.

11. The method of claim 10, wherein the step of generating magnetic fields further comprises (i) applying current to the plurality of ribs to thereby generate a rib magnetic field, and (ii) applying current to the plurality of coils to thereby generate a coil magnetic field.

12. The method of claim 11, wherein the rib magnetic field and the coil magnetic field are orthogonal magnetic fields.

13. The method of claim 10, wherein the plurality of ribs are substantially orthogonal to the plurality of coils.

14. The method of claim 7, wherein the interaction boundary includes at least one of a counter-flow interaction, an opposed-flow interaction, and an aligned-flow interaction.

15. A plasma interaction simulator, comprising:
a plasma container sphere;
a plurality of ribs and a plurality of coils configured to yield magnetic fields that induce a flow of plasma within the plasma container sphere; and
wherein the plurality of ribs comprises a rib having a front end and a rear end, and wherein the rear end of the rib is disposed radially away from the plasma container sphere.

16. The simulator of claim 15, wherein the rib is substantially orthogonal to a coil of the plurality of coils.

17. The simulator of claim 15, wherein the plurality of coils comprises an outer coil that is disposed between the plasma container sphere and the front end of the rib.

18. The simulator of claim 15, wherein the plurality of coils comprises an inner coil that is disposed between the front end and the rear end of the rib.

19. The simulator of claim 15, wherein the plurality of coils comprises an outer coil that is disposed on an exterior of the rear end of the rib.

20. The simulator of claim 15, further comprising an ionization source configured to ionize a gas mixture in the plasma container sphere.

\* \* \* \* \*